United States Patent [19]
Rizzo
[11] 3,798,462
[45] Mar. 19, 1974

[54] TOUCH CONTROLLED SWITCHING CIRCUIT

[76] Inventor: Anthony Rizzo, 40 Center St., Pittston, Pa. 18640

[22] Filed: Dec. 21, 1972

[21] Appl. No.: 317,153

[52] U.S. Cl. .............................. 307/116, 340/365 C
[51] Int. Cl. .............................................. H01h 35/00
[58] Field of Search ................ 307/116; 200/DIG. 1; 340/365 C; 328/5; 317/DIG. 2

[56] References Cited

UNITED STATES PATENTS

| | | | |
|---|---|---|---|
| 3,530,310 | 9/1970 | Adelson et al. | 340/365 C |
| 3,254,313 | 5/1966 | Atkins et al. | 331/111 |
| 3,493,791 | 2/1970 | Adelson et al. | 340/365 C |

*Primary Examiner*—Herman J. Hohauser
*Assistant Examiner*—William J. Smith
*Attorney, Agent, or Firm*—Brady, O'Boyle & Gates

[57] ABSTRACT

An electronic solid state switching system is disclosed, which is responsive to the touch of the human body and operates to connect an electric load to an alternating current power distribution system, or to disconnect the load. By its presence in the electromagnetic environment attributable to the power distribution system, the human body has an induced potential which, upon contact with a touch point serving as the input connection to the switching system, produces an alternating current for control of the switching system. The circuits of the switching system are shown as including a "latching circuit" responsive to a touch of relatively long duration to establish and maintain the load in connection with the power source in a switched ON condition; a touch of relatively short duration results in disconnection of the load and establishes — or maintains — a switched OFF condition. The switching system is shown as operating from a 12 v., dc, power source provided by a rectifier circuit connected to the alternating current power supply. The ON-OFF switch device controlled by the switching system is indicated as being a suitable solid state device such as a Triac; however, the load to be switched will determine the type of switch device selected.

11 Claims, 2 Drawing Figures

TOUCH CONTROLLED SWITCHING CIRCUIT

BACKGROUND OF THE INVENTION

The invention relates broadly to the field of touch actuated, electronic solid state switching systems, and more particularly to switching systems for ON or OFF operation under control of a human operator. Furthermore, the invention relates to touch actuated switching systems in which the operation of the switch depends upon an alternating current initiated at the touch point by an operator having an induced potential due to his presence in the electromagnetic environment produced by an alternating current power distribution system.

The prior art contains a number of examples of touch actuated, electronic solid state switching systems. A group of these treat the operator as a passive element (capacitor, inductance or resistance) capable of affecting the operation of switching systems dependent entirely upon internal power sources. This group is not relevant to the present invention. A few patents treat the operator as an active element, as does the present invention, but differ from the present invention in objectives and corresponding circuit features. Patents in this group which produce a momentary switching to ON condition while touch is applied, and those which produce an ON or OFF condition by using separate touch points or other means are not relevant. The problem of providing a touch actuated switch for connecting a load in ON or OFF condition through the medium of a single touch point is met in the system disclosed herein.

SUMMARY OF THE INVENTION

It is an object of the invention to provide an improved solid state, touch responsive electrical ON-OFF switch wherein a current sensitive semiconductor element is operated by an alternating current produced by the voltage pick-up, or induced potential, of the human body when contact is made by the body at a touch point connected to the current sensitive element, and the subsequent operation of the touch responsive switch is dependent upon the duration of the contact at the touch point.

A further object of the invention is to provide a touch responsive switch having a single touch point for controlling connection of a load in ON or OFF condition wherein the load, normally in OFF condition, is put or kept in that condition by a touch of relatively short duration and is switched to ON condition by a touch of relatively long duration.

Another object of the invention is to provide a touch responsive, electronic solid state ON-OFF switch with improved resistance to accidental or false triggering to ON condition, due to inadvertent contact or a simulated signal which may be shown to influence and activate touch responsive switches of other design. For example, it has been demonstrated that a touch responsive switch of a type now used to call an elevator to a certain floor in a building may be triggered by intense heat, as from a fire or as simulated by a burning match held close to the touch point, without contact with the touch point.

Still another object of the invention is to provide a touch responsive switch adaptable to various uses, including loads of various magnitudes, and including applications in which the ON condition is established by a human operator by a touch of sufficiently long duration and the OFF condition by any appropriate automatic device.

The touch controlled switching circuit of the invention consists of a power translator circuit for signals from the touch point when touch is applied, a voltage control circuit which determines the polarity and magnitude of a signal voltage as it changes with touch duration, and a latching circuit for control of the switch which connects the load in ON or OFF condition according to the polarity and magnitude of the signal voltage when the touch is removed. Power for operating the switching circuit is regulated 12 v., dc, drawn from the main alternating current power distribution system through a solid state rectifier circuit, and is independent of the load and its ON-OFF switch. The particular objects of the invention are thus achieved in a touch controlled switching circuit which establishes a connection of the load in ON condition only upon application of a touch for a sufficiently long period of time as determined by the specific design of a touch switch in accordance with the invention.

BRIEF DESCRIPTION OF THE DRAWINGS

Other objects of the invention will be apparent from the following specification and by reference to the accompanying drawings, in which.

DESCRIPTION OF THE PREFERRED EMBODIMENT

Figure 1:
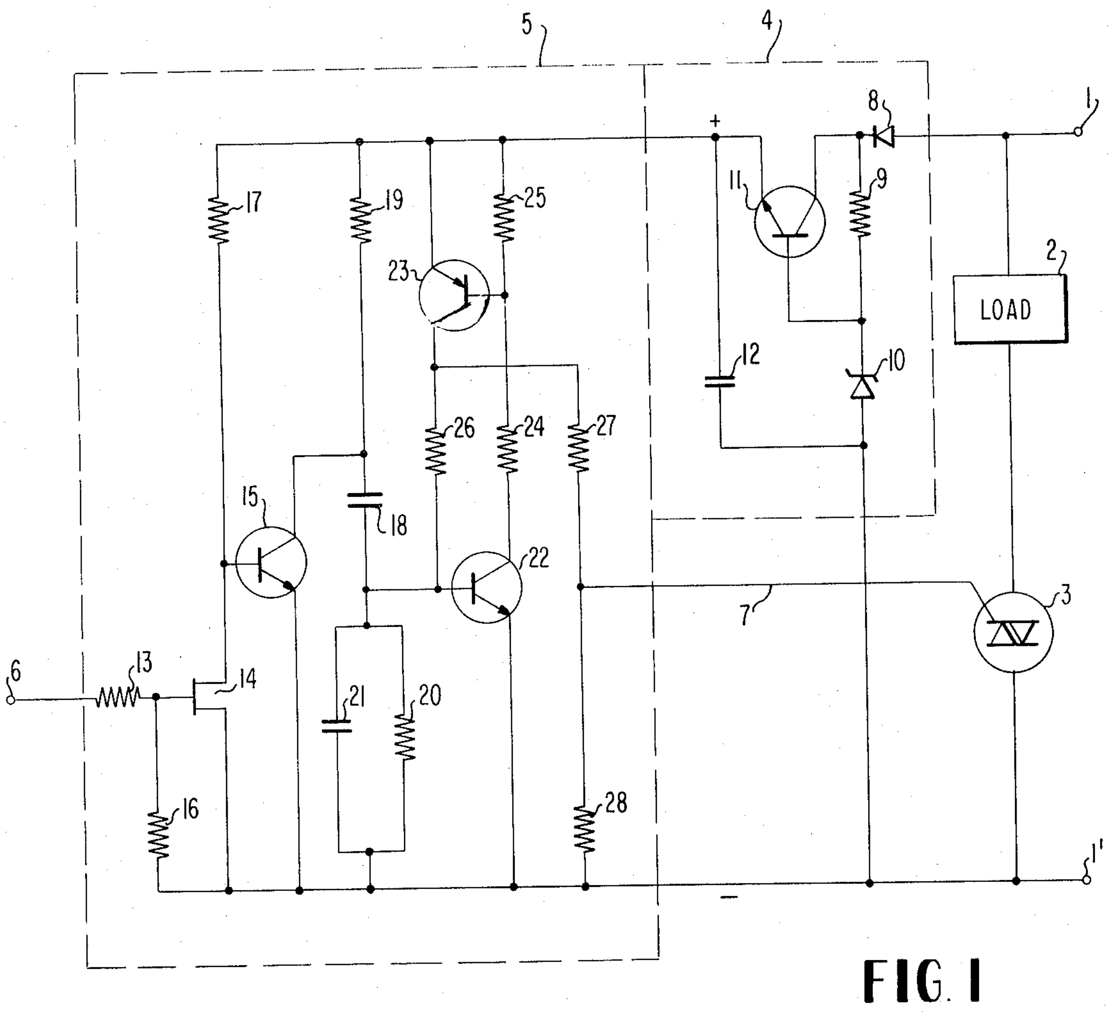
FIG. 1 is a schematic diagram of the electrical circuits in the touch duration dependent switch of the invention.

Referring to the drawings in detail, FIG. 1 indicates the general arrangement of the related elements of the switched system in a preferred embodiment of the invention. At 1 and 1' are the terminals for the source of electrical power (nominally 110 v., 60 hz.); at 2 is the load to be controlled by the ON-OFF switch device at 3, elements 2 and 3 being connected in series to the power supply terminals 1, 1'. At 4 is a rectifier circuit connected to the power source and operating to provide low voltage direct current (nominally 12 v. dc) for the switching system of the invention, which is shown generally at 5 with an input from a touch point 6 and an output connection at 7 to control the ON-OFF switch device 3.

The touch activated switch of the invention is intended for use primarily in areas served by commercial alternating current power sources and with loads of various magnitudes. The main switch device 3 is indicated as a Triac with its main terminals connected in series with the load and the source of power and its gate terminal connected to the output line 7 of the switching system 5. Other types of thyristor may be used. Selection of the device to serve as the main switch depends chiefly on the line voltage from the power source and the wattage of the load; mechanical relays may be used when appropriate.

The switching system, 5, as disclosed, operates from a nominal 12 volts, direct current. A rectifier circuit is provided to derive 12 volts dc from the alternating current power source. The rectifier circuit, 4, is shown as comprising a diode half wave rectifier 8, resistor 9, Zener diode 10 (13 volt) used to regulate the voltage to switching system 5, NPN power transistor 11, and smoothing capacitor 12. The resistor 9 supplies base drive for transistor 11 and current to the Zener diode 10, which keeps the base of the transistor 11 at 13 volt potential when diode 8 is forward biased and conducting. Capacitor 12 serves to maintain current to switching system 5 when diode 8 is reverse biased. Thus, power transistor 11 and capacitor 12 are enabled to provide current to switching system 5 at a regulated 12 volt dc potential.

It will be understood that other ac/dc rectifier arrangements may be employed in lieu of the specific circuit shown at 4, or other provisions may be made to supply the 12 v. dc power for the switching system 5.

As mentioned, the touch activated switch of the invention is intended for use primarily in areas served by alternating current power sources. The electromagnetic environment resulting from the presence in such areas of networks of wires and cables carrying alternating current is such that persons in the area carry an induced alternating current potential at the frequency (60 hz.) of the prevailing power supply system. This electrical potential, carried by the human body so long as it is in the electromagnetic environment, is used to trigger the switch action when the person touches the touch point 6.

As will be explained later in this disclosure, the ON-OFF operation of the switching system 5 depends upon the duration of the touch on touch point 6. That is, a relatively short duration touch results in a steady state OFF condition whereas a relatively long duration touch results in a steady state ON condition at the load 2.

Referring to the switching system 5 in detail, the touch point 6 is connected through a resistor 13 to the base of a current sensitive field effect transistor (FET) at 14. Resistor 13 is of sufficiently high value to eliminate any shock hazard to the person touching the touch point 6. Transistor 14 acts as a high impedance input receiver for the 60 hz. (or other frequency) current resulting from contact by the person carrying an electrical potential with touch point 6, as described. Transistor 14 is normally "on" and acts to apply a negative bias from the negative line of the rectifier circuit 4 to the base of a transistor 15 to hold transistor 15 "off" when no touch is made at touch point 6. Resistor 16 is used to reference the gate of transistor 14 to its current drain in the normally "on" condition.

Receipt of 60 hz. current from touch point 6 causes transistor 14 to turn "off" at a 60 hz. rate as the gate of transistor 14 swings negative (on negative half cycles of the 60 hz. input). Transistor 15 is a low power NPN type transistor, used as a power translator stage for transistor 14 to increase the power above that derived from the touch action at touch point 6. Transistor 15 is normally "off" with transistor 14 "on" under no-touch conditions and operates "off" and "on" at a 60 hz. rate under control of transistor 14, when touch is applied at 6. Resistor 17 provides base current to transistor 15 when it is operating under "on" conditions. The off-on output at the collector of transistor 15 therefore provides signals which represent the 60 hz. potential applied at touch point 6 and which act to control operation of the remainder of the switching system to establish the switch device 3 in ON or OFF condition.

The next stage in the switching system is a voltage control circuit connected to the output of transistor 15 and delivering controlled voltage to the final stage, which may be referred to as the latching circuit. The latching circuit connects with the ON-OFF switch device 3 at line 7.

The voltage control circuit consists of an electrolytic capacitor 18 connected to the positive line of the 12 v., dc, power through a resistor 19, and to the negative line of the 12 v., dc, power through a resistor 20 and a capacitor 21 connected in parallel. The connection to transistor 15 is from the junction of capacitor 18 and resistor 19 to the collector of transistor 15; resistor 19 thus serves also to connect the collector of transistor 15 to the positive line of the 12 v., dc, power. The emitter of transistor 15 is connected to the negative line of the 12 v., dc, power. Transistor 15 thus provides a shunt for the series connected capacitor 18 and the parallel connected resistor 20 and capacitor 21; the shunt is normally open, under no-touch conditions.

The collector of transistor 15 is connected through capacitor 18 to the base of another transistor, 22, in the latching circuit, and the potential at this point is the output of the voltage control circuit. The output of the voltage control circuit may be described also as a connection from the junction of capacitor 18 with resistor 20 and capacitor 21, which are connected in parallel.

With switch device 3 in OFF condition and no touch applied at touch point 6, capacitor 18 is normally charged to about 12 v., and no current is flowing. The voltage at the base of transistor 22 is essentially zero, and transistor 22 is not conducting.

Resistor 20 serves also to prevent leakage currents from activating transistor 22; and capacitor 21 also acts as a noise filter to prevent ac line transients from falsely triggering transistor 22.

Figure 2:
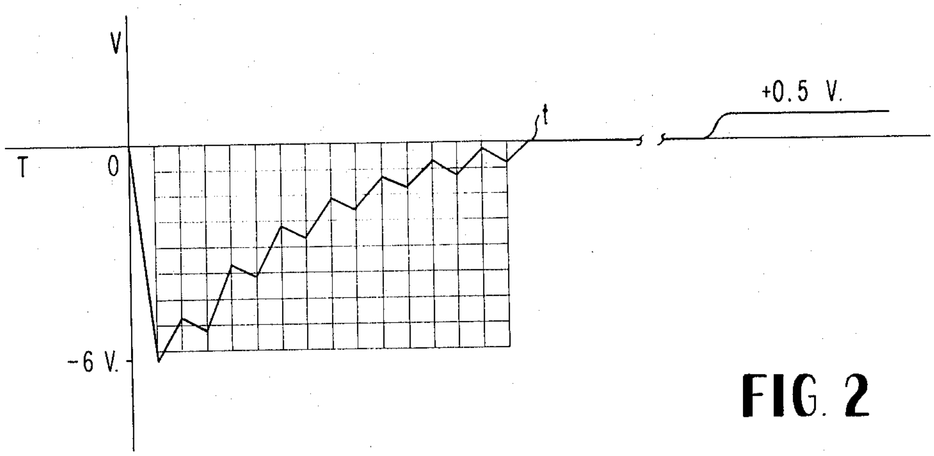
FIG. 2 is a voltage-time graph indicating the effect of the touch time factor in the operation of the switch.

It will be helpful at this point to refer to FIG. 2 which is a graph indicating the voltage at the base of transistor 22 in reference to time; voltage is plotted as the ordinate (V) and time as the abscissa (T). At $T = 0$, with no touch applied at 6, transistor 15 is "off" and no current flows in the circuit comprising transistor 15, capacitor 18, resistor 20 and capacitor 21. No signal is applied to the base of transistor 22 and the latching circuit is in a steady state OFF condition.

When touch is applied at 6 and transistor 15 operates "off" and "on" at a 60 hz. rate, as explained above, the initial surge of current from capacitor 18 through transistor 15 in "on" condition causes the base voltage of transistor 22 to be driven negative to about −6 volts, this value being dependent upon the ratio of the capacitances of capacitors 18 and 21. With continuation of the touch applied at 6 and continued operation of transistor 15 at a 60 hz. rate, the voltage at the base of transistor 22 will rise exponentially to 0 v., dc, in a period of time dependent upon the RC time constant of the voltage control circuit. If the touch is removed at some time before Time $t$, when the voltage would reach zero, transistor 22 will not operate and the latching circuit will rest in OFF condition. If the touch is continued beyond Time $t$, the voltage on the base of transistor 22 will remain at 0 v., dc, until the touch is removed; at that time, a transient current will flow from the positive line of the 12 v., dc, source (rectifier 4) through resistor 19 and capacitor 18 to the base of transistor 22. This results in a positive polarity voltage of about 0.5 v., dc, on the base of transistor 22 which is thereby activated to "on" condition.

FIG. 2 shows a "ripple" in the exponential rise of the voltage on the base of transistor 22. This is due to the "off" and "on" operation of transistor 15. The "ripple" does not affect the operation of the latching circuit but may be reduced by increasing the capacitance of capacitor 18 or inclusion of suitable filtering means.

The final stage of the switching system of the invention is the latching circuit. As indicated in FIG. 1, transistor 22 is a low power NPN type transistor with its emitter connected to the negative line of the 12 v., dc source and its collector to the base of transistor 23 through limiting resistor 24. A resistor 25, between the base of transistor 23 and the positive line of the 12 v., dc source is used to prevent leakage currents from activating transistor 23.

Transistor 23 is a low power PNP type transistor with its emitter connected to the positive line of the 12 v., dc source and its collector to the base of transistor 22 through limiting resistor 26. The output of the latching circuit is a connection from the collector of transistor 23, through limiting resistor 27, to the connection 7 for control of the ON-OFF switch device 3. A resistor 28, between the connection 7 and the negative line of the 12 v., dc source serves to prevent leakage currents from activating switch device 3.

The operation of transistor 22 as a result of a sufficiently long touch on touch point 6, as explained, permits a transient current to flow through resistor 24 to the base of transistor 23. Transistor 23 thereupon becomes operational and current flows through resistor 26 to the base of transistor 22 to continue it — and transistor 23 — in operation after removal of the touch and the end of the transient current. The circuit is thus latched in a steady state ON condition and switch device 3 is established in a steady state ON condition.

Unlatching after the switch device 3 is energized in ON condition is effected by a relatively short duration touch by the operator at touch point 6. As explained, this relatively short duration touch does not permit the voltage on the base of transistor 22 to rise sufficiently and transistor 22 is deactivated.

The Time t, indicated in FIG. 2 as a time with reference to which a touch terminating at some time previous is a touch of relatively short duration and a touch continuing to any time later is a touch of relatively long duration, is dependent primarily upon the ratio of the capacitances 18 and 21 and the time constant of the voltage control circuit.

A momentary touch (less than one second) and a touch of more than one second may, for example, be considered of relatively short and long duration, respectively. In such a design for the touch switch of the invention, Time t would be selected to be one second. Very limited experience in use of the switch will be sufficient to familiarize an operator with the distinction in touch duration.

The 60 hz. current produced by contact by the operator at touch point 6 is not of limited duration. That is, the person does not carry an electrical "charge," as in an equivalent capacitance or inductance, which is exhausted through contact. Rather, the continued presence of the person in the electromagnetic environment resulting from an alternating current power system serving the area means that the induced potential for operating the touch switch of the invention is present on a continuing basis. (This condition is not unique to the particular person operating the switch as all persons in the electromagnetic environment are subject to the same influence, which has not been considered harmful.)

While the invention has been shown and described in a preferred embodiment, it is realized that modifications can be made without departing from the concept and the scope of the invention, and it is to be understood that no limitations upon the invention are intended other than those imposed by the scope of the appended claims.

What I claim as new and desire to secure by letters patent of the United States is as follows:

1. In an alternating current electromagnetic environment, a solid state touch controlled switching system operable from a direct current power source and activated by an alternating current signal produced upon touch at a prescribed touch point by a person having a potential induced by said environment; said switching system including:

means responsive to said alternating current signal after a touch of relatively short duration to provide a deactivating direct current signal, and responsive to said alternating current signal after a touch of relatively long duration to provide an activating direct current signal;

and means responsive to said activating signal to provide and maintain a direct current switching signal;

the last said means, if operative, being responsive to said deactivating signal to terminate said switching signal; the last said means, if inoperative, being non-responsive to said deactivating signal.

2. In an alternating current electromagnetic environment, a solid state, touch controlled switching system operable from a direct current power source and activated by an alternating current produced upon touch at a prescribed touch point by a person having a potential induced by said environment;

said switching system comprising:

a touch point carrying an alternating current while touched by said person;

a power translator circuit having an input connection to said touch point and operating to translate the alternating current at said touch point into on-off conditions at the output, at the frequency of said alternating current;

a voltage control circuit connected with the output of said power translator circuit and operating to produce a direct current (dc) output voltage of a polarity and magnitude dependent upon the duration of a touch at said touch point and further operating upon termination of a touch of relatively long duration to produce a transient voltage of positive polarity;

a latching circuit connected with the output of said voltage control circuit and operating upon receipt of said positive polarity voltage to provide the desired switching current, said latching circuit including means to provide for continuation of said switching current after the transient action of said positive polarity voltage;

and a direct current power source for energizing said switching system.

3. A touch controlled switching system as described in claim 2 in which said voltage control circuit operates upon termination of a touch of relatively short duration to deliver a negative polarity voltage and in which said latching circuit, upon receiving said negative polarity voltage, remains inoperative or, if operative, is made inoperative.

4. A touch controlled switching system as described in claim 2 in which said direct current power source is a rectifier circuit connected with a source of alternating current which also provides power for the load to be switched by said switching system and also contributes to said electromagnetic environment.

5. A touch controlled switching system as described in claim 2 adapted for operating a solid state switch device having two main terminals connected in series with a source of alternating current and a load to be switched ON or OFF;

said solid state switch device having a gate terminal connected with the output of said latching circuit and energized, when said latching circuit is operative, to cause current to flow between said main terminals and provide power to said load;

said switch device being nonconductive when said latching circuit is inoperative.

6. A touch controlled switching system as described in claim 2 in which said power translator circuit comprises:

a current sensitive semiconductor element having its control terminal connected to said touch point and being normally conductive (when no touch is applied) in circuit with said direct current (dc) power source, said current sensitive element being nonconductive on negative half cycles of the alternating current at said control terminal when touch is applied;

and a power translator transistor having its control terminal connected to said current sensitive element and being normally nonconductive under negative bias when said current sensitive element is conductive (no touch applied), said power translator transistor being conductive in circuit with said dc power source, under control of said current sensitive element, at the frequency of the alternating current that results when touch is applied to said touch point;

output of the power translator circuit being provided by connection of the collector of said transistor to said voltage control circuit.

7. A touch controlled switching system as described in claim 2 in which said voltage control circuit comprises:

a resistor and a capacitor connected in series with a parallel circuit including a second resistor and a second capacitor, the other terminal of the first said resistor being connected to the positive line of said direct current (dc) power source, the other terminal of said parallel circuit being connected to the negative line of said dc power source, and the output of said power translator circuit being connected to the junction of the first said resistor and the first said capacitor;

and an output connection from the junction of the first said capacitor and said parallel circuit to the input of said latching circuit;

both said capacitors being normally charged (no touch applied) by power from said dc source, the "on" condition at the output of said power translator circuit when touch is applied being a shunt across the series connected first said capacitor and said parallel circuit operating initially to drive the potential on said output connection to a negative value depending upon the ratio of the capacitances of the two said capacitors and upon the voltage of said dc power source, the "off" condition at the output of said power translator circuit at successive intervals while touch is applied being an open circuit which permits the potential on said output connection to rise to 0 v., dc, exponentially, dependent upon the time constant of said voltage control circuit;

removal of the touch at some time before the output potential reaches 0 v. leaving said latching circuit inoperative;

continuation of the touch until some time after the output potential reaches 0 v. resulting, upon removal of the touch, in a transient positive potential on said output connection for operation of said latching circuit.

8. A touch controlled switching system as described in claim 2 in which said latching circuit comprises:

an NPN type transistor having its base connected with the output of said voltage control circuit, its emitter to the negative line of said direct current (dc) power source, and its collector to the base of a second transistor through a limiting resistor;

a PNP type transistor (said second transistor) having its emitter connected to the positive line of said dc power source and its collector to the base of said NPN type transistor through a limiting resistor;

said NPN type transistor operating upon receipt of said positive polarity voltage from said voltage control circuit to trigger said PNP type transistor into operation, whereupon the base of said NPN type transistor receives current from the positive line of said dc power source, remains in operation and continues to activate said PNP type transistor;

and an output connection from the collector of said PNP type transistor to provide the desired switching current.

9. A touch controlled switching system as described in claim 8 in which said voltage control circuit operates upon termination of a touch of relatively short duration to deliver a negative polarity voltage, said NPN type transistor operating upon receipt of said negative polarity voltage to deactivate said PNP type transistor.

10. In an alternating current electromagnetic environment, a solid state, touch controlled switching system operable from a direct current power source and activated by an alternating current produced upon touch at a prescribed touch point by a person having a potential induced by said environment; said switching system comprising:

1. a direct current (dc) power source consisting of a rectifier circuit connected with a source of alternating current which also provides power for the load to be switched and contributes to said electromagnetic environment;
2. a touch point carrying an alternating current while touched by said person;
3. a power translator circuit comprising: a current sensitive semiconductor element having its control terminal connected to said touch point and being normally conductive (no touch applied) in circuit with said dc power source, said current sensitive element being nonconductive on negative half cycles of the alternating current at said control terminal when touch is applied;

and a power translator transistor having its control terminal connected to said current sensitive element and being normally nonconductive under negative bias when said current sensitive element is conductive, said power translator transistor being conductive in circuit with said dc power source, under control of said current sensitive element, at the frequency of the alternating current that results when touch is applied to said touch point;

the emitter of said power translator transistor being connected to the negative line of said dc power source, and the collector being the output terminal for said power translator circuit;

4. a voltage control circuit comprising:

a resistor and a capacitor connected in series with a parallel circuit including a second resistor and a second capacitor, the other terminal of the first said resistor being connected to the positive line of said dc power source, the other terminal of said parallel circuit being connected to the negative line of said dc power source, and the said output terminal of said power translator circuit being connected to the junction of the first said resistor and the first said capacitor;

and an output connection from the junction of the first said capacitor and said parallel circuit;

both said capacitors being normally charged (no touch applied) by power from said dc power source;

the said power translator transistor in said power translator circuit, when conductive during an applied touch, being a shunt across the series connected first said capacitor and said parallel circuit operating initially to drive the potential on said output connection to a negative value depending upon the ratio of the capacitances of the two said capacitors and upon the voltage of said dc power source, the non-conductive condition of said power translator transistor at successive intervals while touch is applied being an open circuit which permits the potential on said output connection to rise to 0 v., dc, exponentially, dependent upon the time constant of said voltage control circuit;

removal of the touch at some time before the output potential reaches 0 v. resulting in a deactivating or nonactivating output signal;

continuation of the touch until some time after the output potential reaches 0 v. resulting, upon removal of the touch, in a transient positive potential as an activating signal on said output connection; and 5. a latching circuit comprising:

an NPN type transistor having its base connected with the said output connection of said voltage control circuit, its emitter to the negative line of said dc power source, and its collector to the base of a second transistor through a limiting resistor;

a PNP type transistor (said second transistor) having its emitter connected to the positive line of said dc power source and its collector to the base of said NPN type transistor through a limiting resistor;

said NPN type transistor operating upon receipt of said transient positive potential from said voltage control circuit to trigger said PNP type transistor into operation, whereupon the base of said NPN type transistor receives current from the positive line of said dc power source, remains in operation and continues to activate said PNP type transistor;

said NPN type transistor being inoperative upon receipt of a deactivating or nonactivating signal from said voltage control circuit;

and an output connection from the collector of said PNP type transistor to provide the desired switching current.

11. A touch controlled switching system as described in claim 10 adapted for operating a solid state switch device having two main terminals connected in series with a source of alternating current and a load to be switched ON or OFF, said solid state device having a gate terminal connected with the output connection of said latching circuit and energized when said latching circuit is operative to provide the desired switching current.

* * * * *